US011337233B2

(12) United States Patent
Bharadwaj et al.

(10) Patent No.: US 11,337,233 B2
(45) Date of Patent: May 17, 2022

(54) COMMUNICATION USING SEMI-PERSISTENT SCHEDULING AND SENSING

(71) Applicant: QUALCOMM Incorporated, San Diego, CA (US)

(72) Inventors: Arjun Bharadwaj, Poway, CA (US); Kapil Gulati, Hillsborough, NJ (US); Sudhir Kumar Baghel, Hillsborough, NJ (US); Shailesh Patil, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 16/511,994

(22) Filed: Jul. 15, 2019

(65) Prior Publication Data

US 2020/0053747 A1 Feb. 13, 2020

Related U.S. Application Data

(60) Provisional application No. 62/716,820, filed on Aug. 9, 2018.

(51) Int. Cl.
*H04W 72/12* (2009.01)

(52) U.S. Cl.
CPC ... *H04W 72/1242* (2013.01); *H04W 72/1226* (2013.01)

(58) Field of Classification Search
None
See application file for complete search history.

(56) References Cited

U.S. PATENT DOCUMENTS

2008/0084851 A1* 4/2008 Kim .................... H04W 72/048 370/336
2009/0052463 A1 2/2009 Chen et al.
2017/0055280 A1* 2/2017 Kim .................. H04W 72/1278
2019/0068342 A1* 2/2019 Kumar Parameswarn Rajamma .............. H04W 76/14
2019/0082359 A1* 3/2019 Wei .................... H04W 36/0058
2019/0246376 A1* 8/2019 Tang ................... H04W 52/242

OTHER PUBLICATIONS

International Search Report and Written Opinion—PCT/US2019/042055—ISA/EPO—dated Sep. 20, 2019.
Orfanos G., et al., "A Centralized MAC Protocol with QoS Support for Wireless LANs", IEEE International Symposium on Personal, Indoor and Mobile Radio Communications, PIMRC, IEEE; PI, XX, Sep. 1, 2007, pp. 1-5, XP031168598, ISBN: 978-1-4244-1143-6, p. 2-p. 3, figures 1,3.

* cited by examiner

*Primary Examiner* — Ajit Patel
*Assistant Examiner* — Pamit Kaur
(74) *Attorney, Agent, or Firm* — Harrity & Harrity, LLP

(57) ABSTRACT

Various aspects of the present disclosure generally relate to wireless communication. In some aspects, a user equipment (UE) may transmit a first transmission, wherein the first transmission includes information identifying a window, and wherein the UE is to transmit at least part of a second transmission in the window; and transmit at least part of the second transmission in the window. Numerous other aspects are provided.

30 Claims, 7 Drawing Sheets

COMMUNICATION USING SEMI-PERSISTENT SCHEDULING AND SENSING

CROSS-REFERENCE TO RELATED APPLICATIONS

This application claims priority to U.S. Provisional Patent Application No. 62/716,820, filed on Aug. 9, 2018, entitled "COMMUNICATION USING SEMI-PERSISTENT SCHEDULING AND SENSING," which is hereby expressly incorporated by reference herein.

FIELD OF THE DISCLOSURE

Aspects of the present disclosure generally relate to wireless communication, and more particularly to techniques and apparatuses for communication using semi-persistent scheduling and sensing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a first transmission, wherein the first transmission includes information identifying a window, and wherein the UE is to transmit at least part of a second transmission in the window; and transmitting at least part of the second transmission in the window.

In some aspects, a UE for wireless communication may include memory and one or more processors operatively coupled to the memory. The memory and the one or more processors may be configured to transmit a first transmission, wherein the first transmission includes information identifying a window, and wherein the UE is to transmit at least part of a second transmission in the window; and transmit at least part of the second transmission in the window.

In some aspects, a non-transitory computer-readable medium may store one or more instructions for wireless communication. The one or more instructions, when executed by one or more processors of a UE, may cause the one or more processors to transmit a first transmission, wherein the first transmission includes information identifying a window, and wherein the UE is to transmit at least part of a second transmission in the window; and transmit at least part of the second transmission in the window.

In some aspects, an apparatus for wireless communication may include means for transmitting a first transmission, wherein the first transmission includes information identifying a window, and wherein the apparatus is to transmit at least part of a second transmission in the window; and means for transmitting at least part of the second transmission in the window.

Aspects generally include a method, apparatus, system, computer program product, non-transitory computer-readable medium, user equipment, base station, wireless communication device, and processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
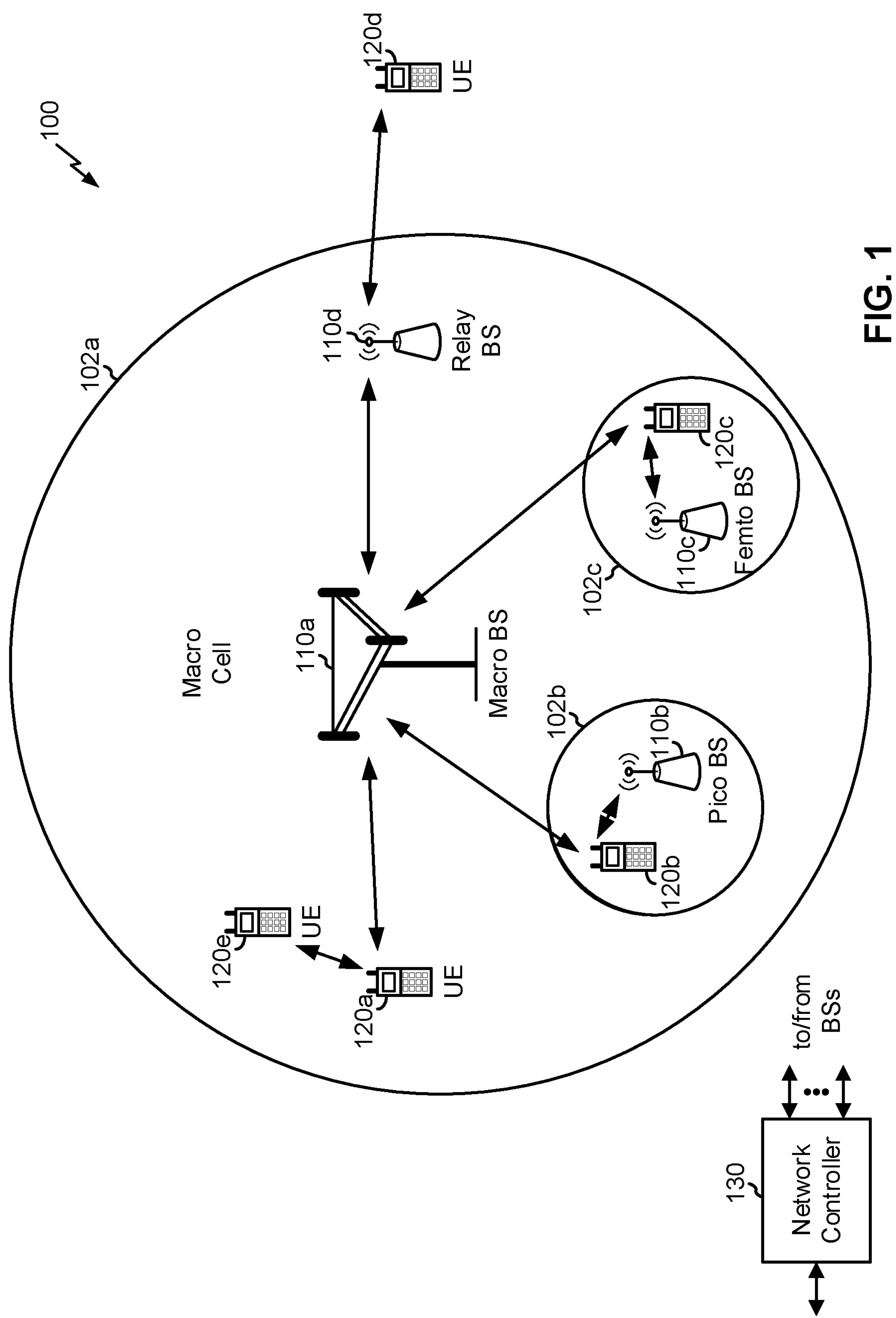
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
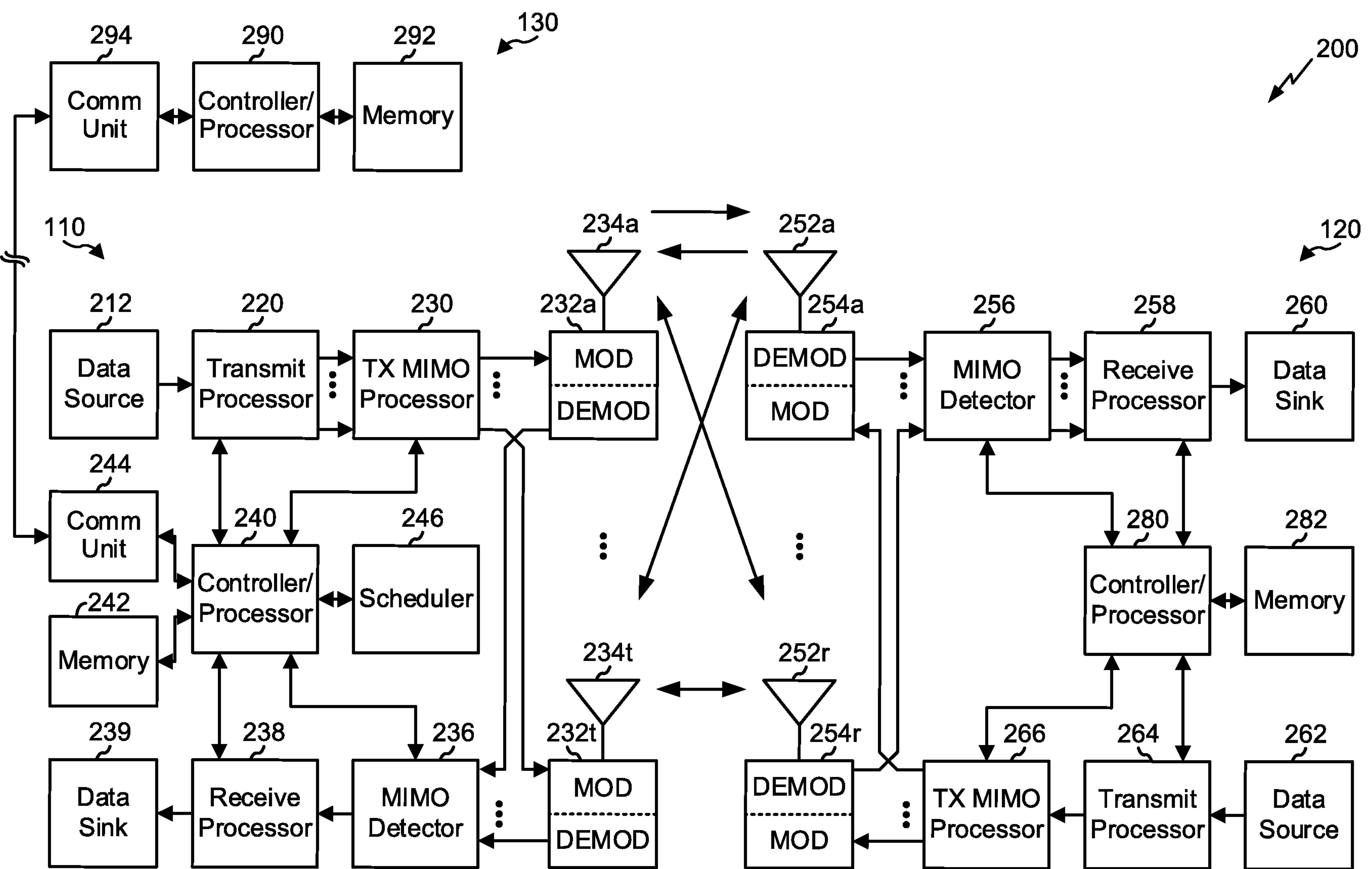
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with communication using semi-persistent scheduling and sensing, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for transmitting a first transmission, wherein the first transmission includes information identifying a window, and wherein the UE is to transmit at least part of a second transmission in the window; means for transmitting at least part of the second transmission in the window; and/or the like. In some aspects, such means may include one or more components of UE 120 described in connection with FIG. 2.

As indicated above, FIG. 2 is provided as an example. Other examples may differ from what is described with regard to FIG. 2.

UEs may communicate with each other using UE-to-UE communications, such as sidelink communications and/or the like. One application of UE-to-UE communication is V2X, in which UEs associated with vehicles may communicate with each other or other devices (e.g., using a type of communication incorporated in V2X, such as vehicle-to-vehicle (V2V), vehicle-to-infrastructure (V2I), and/or the like) without the intervention of a central scheduler. Some In some aspects, UEs may content for transmission resources in each slot. “TTI” may be used for brevity herein, but “slot,” “mini-slot,” “sub-slot,” and/or the like may also be applicable in instances where “TTI” is used, depending on the context. For example, a UE may contend for transmission resources based at least in part on a priority (e.g., an LBT priority, a contention priority, a packet priority (based on priority assignment for each traffic flow), and/or the like) of the UE. LBT priority and contention priority may be used interchangeably herein. As one example, a UE associated with a higher contention priority may contend for transmission resources in a first symbol of a TTI, and a UE associated with a lower contention priority may contend for transmission resources in a later symbol of the TTI (e.g., a third symbol or another symbol). The UE associated with the lower contention priority may determine whether particular resources have been accessed by the UE associated with the higher contention priority by performing an LBT operation with regard to the first symbol of the TTI. Thus, contention may reduce collisions between UEs. In some scenarios, contention may reduce the collision probability by approximately one-half compared to random resource selection.

It may be desirable to reduce collision probability for UE-to-UE communications. For example, some UEs may perform communications that can be periodic, periodic with jitter, or aperiodic. Furthermore, in some cases, many UEs may contend for limited resources. In such cases, collision may reduce the overall throughput of the UEs and impact service levels.

Some techniques and apparatuses described herein provide determination of transmission resources using a technique based at least in part on sensing with regard to the transmission resources. For example, a UE may provide (e.g., in a control channel of a first transmission) information regarding a second transmission (which may be a new transmission, a retransmission of the first transmission, a repetition of the first transmission, and/or the like). The information regarding the second transmission may include information identifying a window (e.g., time and/or frequency resources) for the second transmission. The UE may perform contention in the window, and may be prioritized in the window relative to other UEs. In some aspects, the UE may provide other information regarding the second transmission, such as information identifying a traffic type of the second transmission, information identifying a contention window, and/or the like. In this way, collision of UE-to-UE communication is reduced, thereby improving UE-to-UE communication performance and increasing throughput of UE-to-UE communications.

Figure 3:
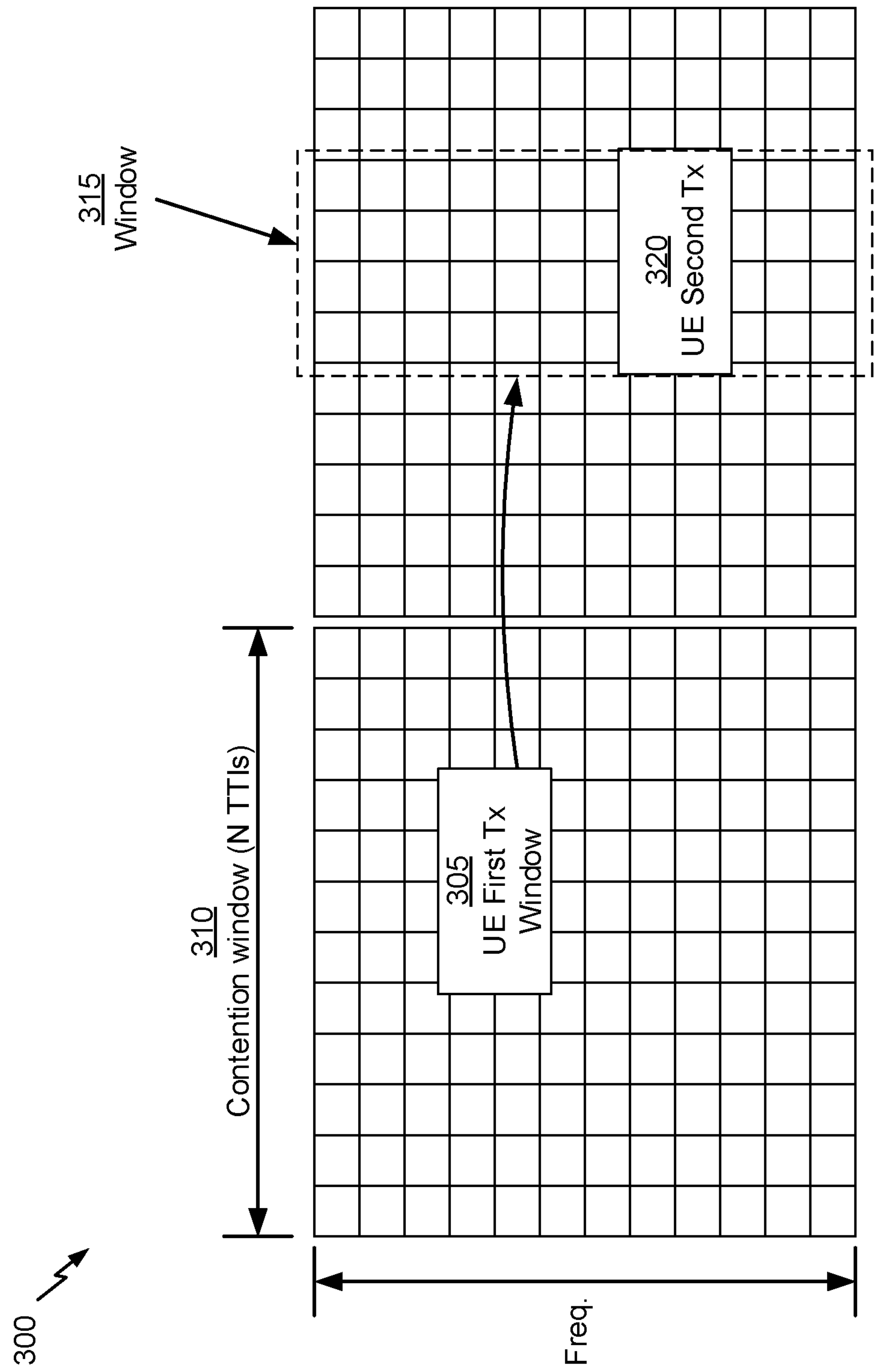
FIG. 3 is a diagram illustrating an example of configuration of a window for a transmission based at least in part on semi-persistent scheduling and/or sensing, in accordance with various aspects of the present disclosure.

FIG. 3 is a diagram illustrating an example 300 of configuration of a window for a transmission based at least in part on semi-persistent scheduling and/or sensing, in accordance with various aspects of the present disclosure. The operations described in connection with FIG. 3 may be performed by a UE (e.g., UE 120).

As shown in FIG. 3, and by reference number 305, the UE may transmit a first transmission. For example, the first transmission may be a UE-to-UE communication, which may be initiated by the UE. As further shown, the first transmission may include information identifying a window. The window may be for a second transmission of the UE. For example, the UE may provide, with a transmission, information identifying the window for a next transmission of the UE. In some aspects, the information identifying the window may include control information. For example, the UE may provide the information identifying the window in a control channel. In some aspects, the first transmission may include only the control information (e.g., the first transmission may not include data). In some aspects, the information identifying the window may be considered a reservation for a retransmission of the first transmission or a transmission of other information.

As shown by reference number 310, the UE may provide the first transmission in a frame associated with a contention window. For example, the contention window may be N TTIs, where N is an integer. In some aspects, the UE may transmit information identifying the contention window to other UEs (e.g., since no central scheduling is involved in the UE-to-UE communication).

In some aspects, the information identifying the window may include information associated with the second transmission. For example, the information identifying the window may identify a traffic type of the second transmission (e.g., whether the second transmission is periodic, periodic associated with jitter, or aperiodic), a jitter value of the second transmission, repetition information or retransmission information for the second transmission, a contention window of the frame in which the window is provided, and/or the like.

The window identified by the information identifying the window is shown by reference number 315. As shown, the window includes one or more TTIs (e.g., time resources) and one or more frequency resources (e.g., tones, subcarriers, channels, etc.). In some aspects, as in FIG. 3, the window may include all frequency resources of a carrier or band associated with the UE. In some aspects, as described in more detail elsewhere herein, the window may include a subset of frequency resources of the carrier or band associated with the UE.

As shown by reference number 320, the UE may perform the second transmission based at least in part on the window. For example, the UE may perform a contention-based access process for the second transmission, and the contention-based access process may be initiated in the window. In some aspects, the second transmission may be entirely included in the window, as shown in FIG. 3. In some aspects, the second transmission may be partially included in the window. For example, the window may be a contention window, in which the UE is to perform contention for the second transmission. In some aspects, the second transmission may occupy an entirety of the window. In some aspects, the UE may perform contention and initiate the second communication in the window, and may conclude the second communication outside of the window. The window may be useful for cases such as aperiodic transmissions or periodic transmissions with jitter, wherein an exact time of the second transmission is not known at the time of the first transmission.

In some aspects, the UE may determine a size of the contention window and/or a location of the contention window. For example, the size and/or the location may be based at least in part on a traffic pattern of the UE (e.g., whether the traffic is periodic or aperiodic, whether the traffic is associated with jitter, a jitter value of the traffic, whether the traffic comprises a retransmission of the first transmission, and/or the like). In some aspects, the size and/or the location may be based at least in part on a latency constraint. For example, the UE may determine the size and/or location so that a latency constraint associated with the second transmission is satisfied. In some aspects, the size and/or the location may be based at least in part on a traffic size of the second transmission. In some aspects, a duration of the second transmission may be based at least in part on the traffic size. In some aspects, the UE may indicate a window that is larger than a resource allocation for the second transmission, which the UE may use for contention-based access for the second transmission. This may be beneficial for aperiodic transmissions or periodic transmissions with jitter, wherein an exact time or frequency resource for the second transmission may not be known at the time of the first transmission.

In some aspects, the UE may indicate a size of the window in both frequency and time. For example, the UE may indicate the size of the window in both frequency and time based at least in part on a latency constraint associated with the second transmission, a packet size of the second transmission, and/or the like. In some aspects, the window may be of a size sufficient to satisfy a latency budget. For example, when an average transmission interval (e.g., time between the first transmission and the second transmission) for the UE is 100 ms, a latency constraint (e.g., a maximum allowable latency) is 10 ms, and a jitter value for the UE is 5 ms, the window may include −5 ms (e.g., a time 0 minus a 5 ms possible jitter) to 15 ms (e.g., a time 0 plus permissible latency of 10 ms and a 5 ms possible jitter) every 100 ms. In this case, the contention window may be 100 ms.

In some aspects, the UE may use a particular LBT priority or a particular contention priority in the window. For example, the UE may use a higher LBT priority or a higher contention priority than other UEs in the window. In other words, other UEs may defer to the UE in the window based at least in part on an LBT operation. In this way, traffic of the UE may be prioritized in the window, which reduces collision of the UE and the other UEs.

As indicated above, FIG. 3 is provided as an example. Other examples may differ from what is described with respect to FIG. 3.

Figure 4:
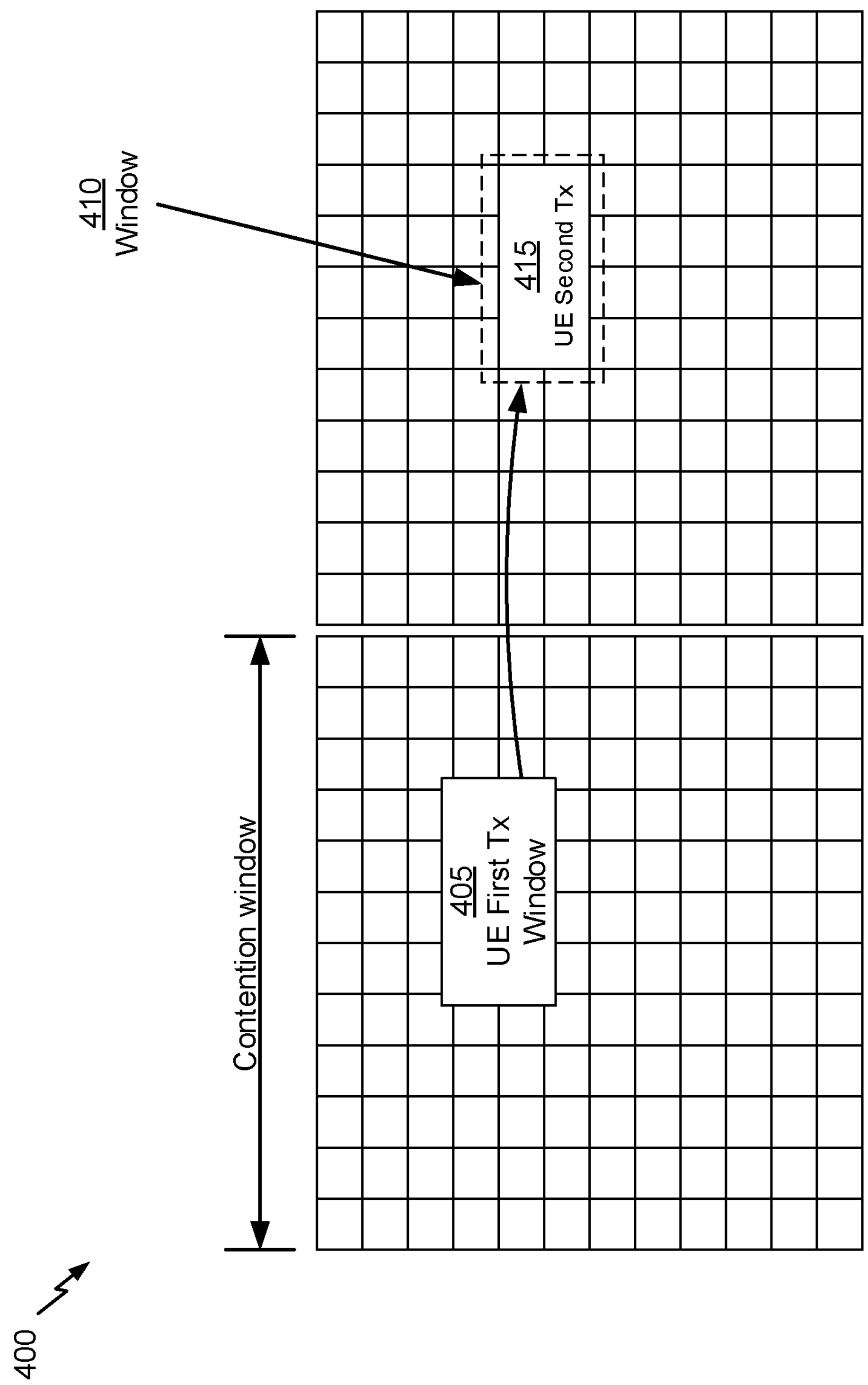
FIG. 4 is a diagram illustrating another example of configuration of a window for a transmission based at least in part on semi-persistent scheduling and/or sensing, in accordance with various aspects of the present disclosure.

FIG. 4 is a diagram illustrating another example 400 of configuration of a window for a transmission based at least in part on semi-persistent scheduling and/or sensing, in accordance with various aspects of the present disclosure.

In example 400, and as shown by reference number 405, a UE (e.g., UE 120) may perform a first transmission, and may provide information identifying a window for a second transmission. The first transmission may comprise a control channel and a data channel, or only a control channel. The window is shown by reference number 410 and the second transmission is shown by reference number 415. Here, the window identifies particular resources (e.g., frequency and/or time resources) for the second transmission. For example, the information identifying the window may identify the particular resources. The second transmission may include a retransmission of the first transmission, or a new transmission different from the first transmission. In some aspects, the UE may transmit the second transmission using the particular resources without performing a contention-based access procedure. In some aspects, the UE may transmit the second transmission using the particular resources based at least in part on a contention-based access procedure. For example, the UE may be associated with a higher LBT priority or contention priority in the particular resources than other UEs. In some aspects, the UE may vary a size of the window for a set of transmissions. For example, the UE may vary the size of a resource allocation of the window to account for varying packet sizes of transmissions, thereby improving resource utilization.

In some aspects, the UE may configure the window or the resource allocation over multiple transmissions. For example, the information identifying the window may indicate that a resource size and/or a duration of the window does not change for multiple transmissions. This may be similar to semi-persistent scheduling. In some aspects, the UE may provide information indicating a duration of the multiple transmissions (e.g., in control information, in a control symbol wherein the SPS is activated, and/or the like). As one example, the information indicating the duration may include a 2-bit value. A first value may correspond to a single-shot SPS (e.g., which may be similar to a random LBT-based scheduling technique). A second value may correspond to a 4-transmission SPS with a predefined periodicity and repeated resource usage. A third value may correspond to a 16-transmission SPS with a predefined periodicity and repeated resource usage. A fourth value may correspond to an indefinite SPS configuration. In the indefinite SPS configuration, data transmission may continue, in a semi-persistent fashion, until explicitly cancelled by the UE.

In this way, the UE may configure the windows based at least in part on SPS, which improves efficiency of resource allocation and reduces collision.

In some aspects, the UE 120 may select particular resources for the second transmission. For example, the second transmission may be transmitted using particular resources. The particular resources may be selected not to overlap preemptive resources associated with one or more other UEs. For example, the particular resources may be selected based at least in part on priority levels of the one or more other UEs performing a transmission in the UE's window.

As indicated above, FIG. 4 is provided as an example. Other examples may differ from what is described with respect to FIG. 4.

Figure 5:
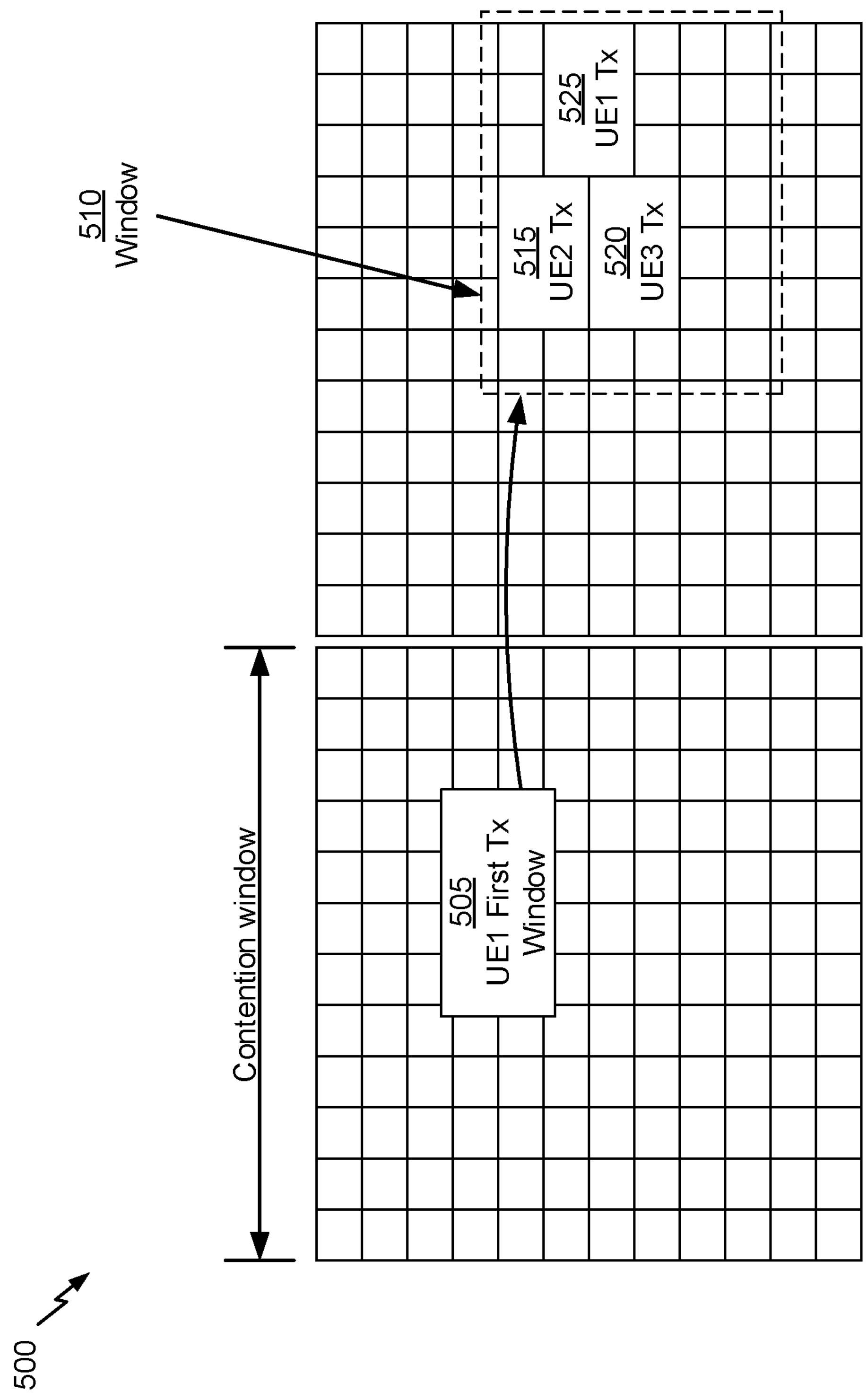
FIG. 5 is a diagram illustrating yet another example of configuration of a window for a transmission based at least in part on semi-persistent scheduling and/or sensing, in accordance with various aspects of the present disclosure.

FIG. 5 is a diagram illustrating yet another example 500 of configuration of a window for a transmission based at least in part on semi-persistent scheduling and/or sensing, in accordance with various aspects of the present disclosure. FIG. 5 shows an example of communication based at least in part on a window (e.g., a contention window) for multiple UEs.

As shown in FIG. 5, and by reference number 505, a UE1 (e.g., UE 120) may perform a first transmission in a first frame. As further shown, the first transmission may include information identifying a window, as described in more detail elsewhere herein. The window, in a second frame, is shown by reference number 510.

As shown by reference numbers 515 and 520, a UE2 and a UE3 (e.g., UEs 120) may perform transmissions in the window. For example, a non-scheduled UE that has not reserved a particular resource may use a vacant TTI of the window for transmission. In such a case, the UE2 and the UE3 may use a lower LBT priority or a lower contention priority than the UE1. For example, the UE1 may use an LBT counter of 0 (indicating that the UE1 uses a first symbol of the TTI for LBT) and the UE2 and the UE3 may use an LBT counter of 1 (indicating that the UE2 and the UE3 are to use a subsequent symbol of the TTI for LBT). In some aspects, the UE2 and/or the UE3 may transmit information identifying respective windows for subsequent transmissions. In this way, UE2 and UE3 may improve resource utilization for subsequent transmissions. As shown by reference number 525, the UE1 may perform the second transmission. For example, the UE1 may perform an LBT operation for the resources in which the UE1 is shown as performing the second transmission, and may perform the second transmission based at least in part on a result of the LBT operation.

In some aspects, a UE may store information associated with transmissions of the UE and/or other UEs. For example, the UE may store information identifying windows of other UEs (e.g., UEs within a transmission range of the UE) and/or explicit allocations of the other UEs (e.g., for periodic transmissions). In some aspects, the UE may store information identifying an ongoing transmission (e.g., an ongoing transmission associated with the UE or another UE), which may enable the UE to avoid colliding with ongoing transmissions.

In some aspects, the UE may select a TTI and/or a frequency resource for contention. For example, the UE may select the TTI based at least in part on sensing information associated with a past TTI. In some aspects, the UE may select the TTI based at least in part on information indicating that the TTI is associated with a number of overlapping windows, such as a threshold number of overlapping windows or a minimum number of overlapping windows. In this way, the UE may reduce or minimize likelihood of collision by using TTIs that are associated with a lower number of contention window overlaps.

In some aspects, the UE may select the frequency resource based at least in part on resource availability. For example, the UE may eliminate frequency resources that the UE knows to be occupied (e.g., based at least in part on the information associated with the transmissions of the UE and/or other UEs, based at least in part on sensing information associated with a past TTI, and/or the like).

In some aspects, the UE may determine that a frequency resource is occupied based at least in part on an explicit indication, an explicit scheduling (e.g., SPS scheduling and/or the like), decoding control information that indicates a TTI bundling configuration, and/or the like). In this way, the UE may select a TTI and/or a frequency resource for contention or transmission based at least in part on information associated with past TTIs and/or control information, which further reduces the likelihood of collision.

In some aspects, a set of UEs may determine a window and/or a resource for contention based at least in part on proximity (e.g., spatial proximity, and/or the like) of the set of UEs. For example, a UE may determine which other UEs are within a threshold distance based at least in part on a proximity threshold. In some aspects, the proximity threshold may be based at least in part on a signal-to-noise ratio (SNR), or a similar value. The UE may identify windows (e.g., contention windows) for the proximate UEs (e.g., based at least in part on sensing or decoding of control information of the proximate UEs). In some aspects, the UE may indicate a window (e.g., a contention window) that overlaps with contention windows of the proximate UEs. For example, a set of proximate UEs may use at least partially overlapping contention windows. This may reduce intra-band emissions and interference, and may conserve bandwidth, by grouping transmissions of proximate UEs. Similarly, when choosing time resources (e.g., TTIs) on which to content, a UE may choose a time resource that is associated with one or more overlapping contention windows of proximate UEs. This may further reduce intra-band emissions and interference. In some aspects, the UE may avoid a contention window indicated by a proximate UE. For example, the UE may select a resource that is associated with a lowest number of windows of proximate UEs. This may improve reception performance.

As indicated above, FIG. 5 is provided as an example. Other examples may differ from what is described with respect to FIG. 5.

Figure 6:
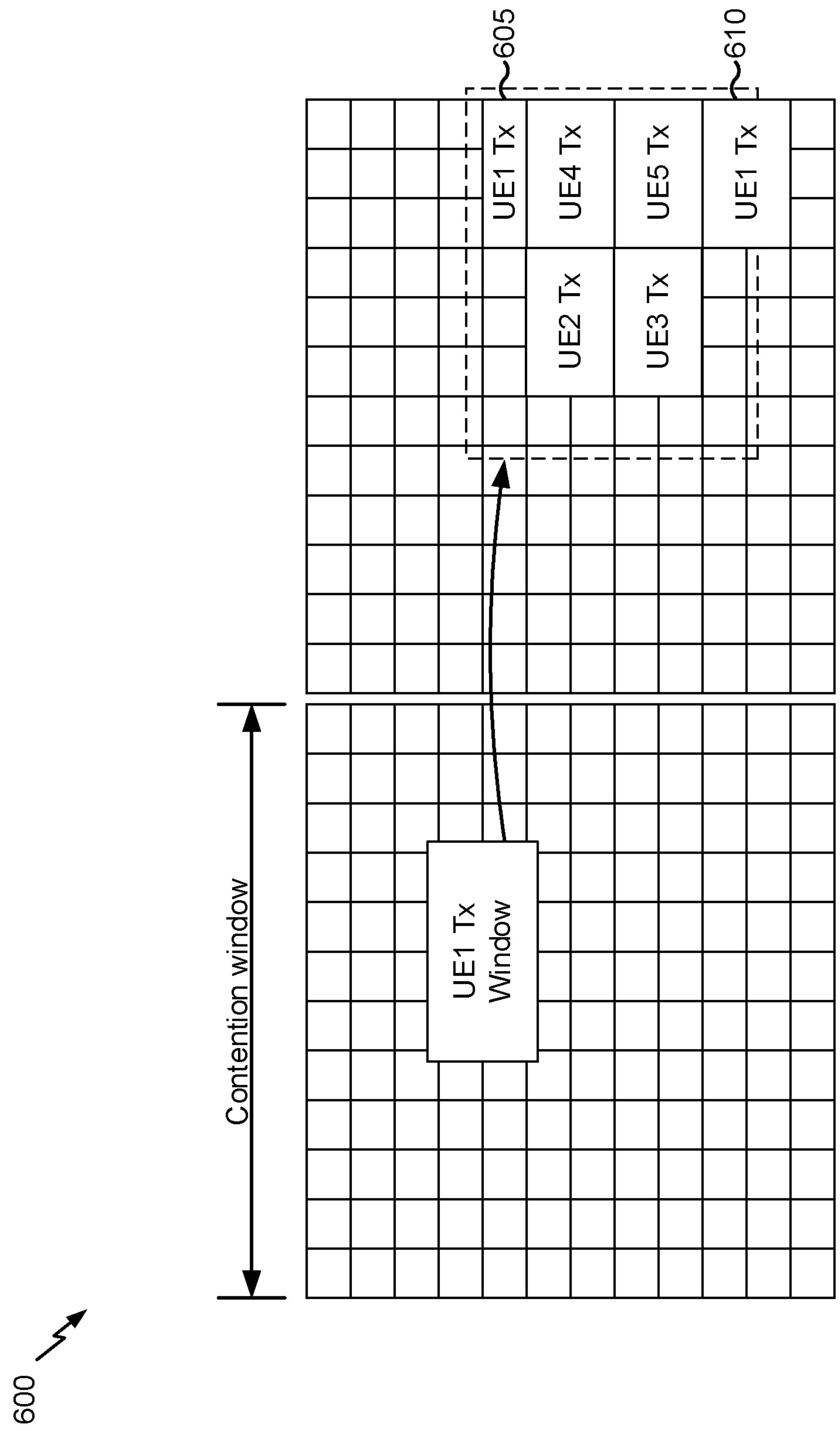
FIG. 6 is a diagram illustrating still another example of configuration of a window for a transmission based at least in part on semi-persistent scheduling and/or sensing, in accordance with various aspects of the present disclosure.

FIG. 6 is a diagram illustrating an example 600 of configuration of a window for a transmission based at least in part on semi-persistent scheduling and/or sensing, in accordance with various aspects of the present disclosure. Example 600 is an example wherein a UE1 (e.g., UE 120) does not secure a contiguous resource allocation within the window.

As shown in FIG. 6, one or more other UEs (e.g., UE2 through UE5) may transmit in the window associated with the second transmission of UE1. Here, UE2 through UE5 occupy resources of the window such that UE1 cannot secure contiguous resources for the second transmission. For example, UE1 may need three frequency resources (e.g., subcarriers, tones, carriers, and/or the like), and UE2 through UE5 may occupy the center four frequencies of the window.

As shown by reference numbers 605 and 610, in some aspects, UE1 may use non-contiguous resources of the window for the second transmission. For example, UE1 may use non-contiguous resources that are included in the window. In some aspects, UE1 may perform a contention-based access procedure using non-contiguous resources that are included in the window. For example, at least part of the second transmission may occur after an end of the window.

As shown by reference number 610, in some aspects, UE1 may use a resource outside of the window (or partially outside of the window) for the second transmission. For example, UE1 may contend for the resource outside of the window. In such a case, UE1 may be associated with a lower LBT priority or a lower contention priority (e.g., a LBT counter of 1). In some aspects, UE1 may abandon the window. For example, UE1 may contend for resources in a resource after an end of the window. In this way, UE1 may contend for non-reserved resources when the window is occupied by other UEs, which provides increased flexibility for the other UEs.

As indicated above, FIG. 6 is provided as an example. Other examples may differ from what is described with respect to FIG. 6.

Figure 7:
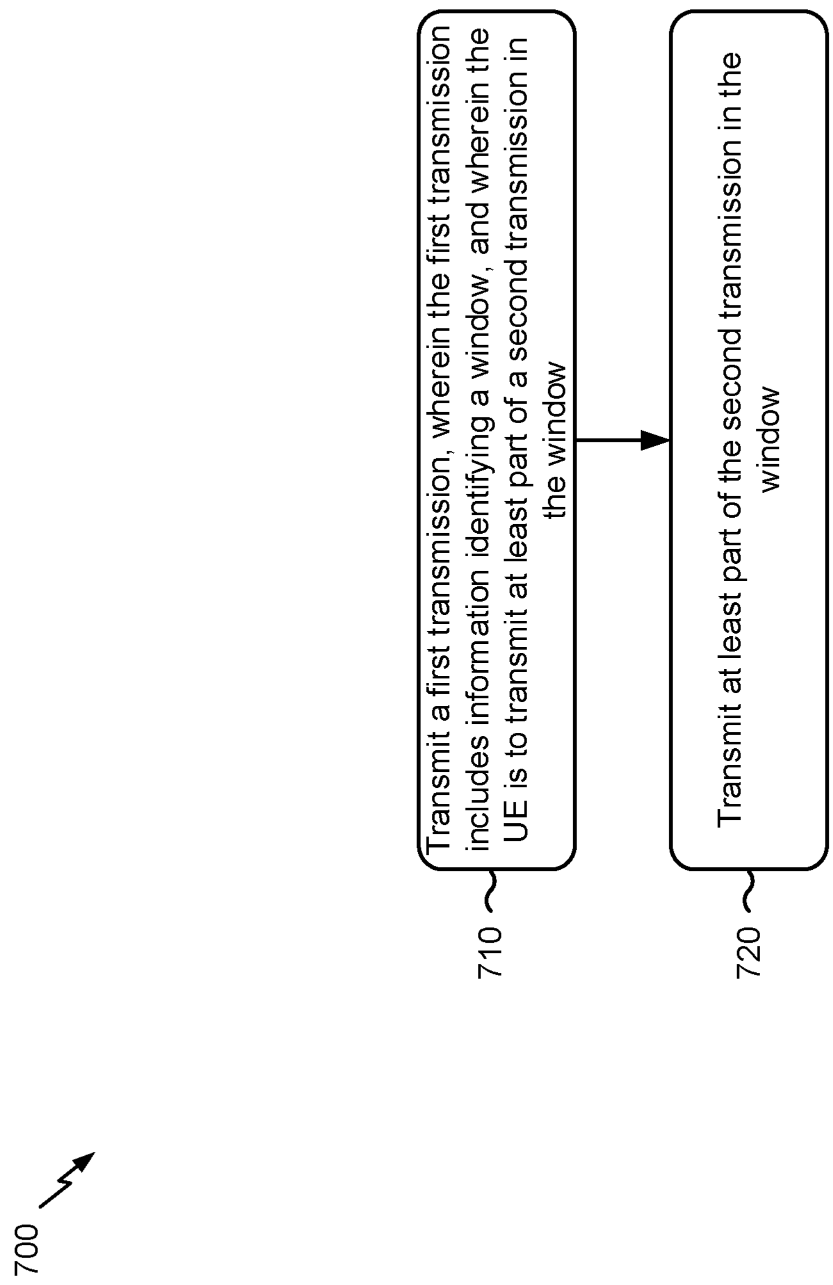
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs configuration of a window for a transmission based at least in part on semi-persistent scheduling and/or sensing.

As shown in FIG. 7, in some aspects, process 700 may include transmitting a first transmission, wherein the first transmission includes information identifying a window, and wherein the UE is to transmit at least part of a second transmission in the window (block 710). For example, the UE (e.g., using controller/processor 280, transmit processor 264, TX MIMO processor 266, MOD 254, antenna 252, and/or the like) may transmit a first transmission. In some aspects, the first transmission may include information identifying a window, such as a contention window. The UE may transmit at least part of a second transmission in the window.

As shown in FIG. 7, in some aspects, process 700 may include transmitting at least part of the second transmission in the window (block 720). For example, the UE (e.g., using controller/processor 280, transmit processor 264, TX MIMO processor 266, MOD 254, antenna 252, and/or the like) may transmit at least part of the second transmission in the window. In some aspects, the UE may perform contention for the second transmission at least partially in the window. In some aspects, the window may be a resource allocation for the second transmission.

Process 700 may include additional aspects, such as any single aspect or any combination of aspects described below and/or in connection with one or more other processes described elsewhere herein.

In a first aspect, the information identifying the window indicates whether the second transmission is for traffic that is periodic, periodic with jitter, or aperiodic.

In a second aspect, alone or in combination with the first aspect, the information identifying the window identifies a length of a frame that is to include the window.

In a third aspect, alone or in combination with one or more of the first and second aspects, the second transmission is based at least in part on a contention procedure performed by the UE in the window.

In a fourth aspect, alone or in combination with one or more of the first through third aspects, the UE is associated with a higher listen-before-talk (LBT) priority or a higher contention priority in the window than another UE.

In a fifth aspect, alone or in combination with one or more of the first through fourth aspects, the information identifying the window identifies a frequency associated with the window and a time associated with the window.

In a sixth aspect, alone or in combination with one or more of the first through fifth aspects, a size or a location of the window is based at least in part on one or more of a traffic pattern associated with the UE or a latency parameter associated with the UE.

In a seventh aspect, alone or in combination with one or more of the first through sixth aspects, the second transmission occupies less than all of the window.

In an eighth aspect, alone or in combination with one or more of the first through seventh aspects, the information identifying the window explicitly indicates resources for the second transmission.

In a ninth aspect, alone or in combination with one or more of the first through eighth aspects, a size of the window is based at least in part on a packet size of the second transmission.

In a tenth aspect, alone or in combination with one or more of the first through ninth aspects, the window is semi-persistently scheduled based at least in part on the information identifying the window.

In an eleventh aspect, alone or in combination with one or more of the first through tenth aspects, the information identifying the window includes one or more bits identifying a repetition scheme or periodicity for the window.

In a twelfth aspect, alone or in combination with one or more of the first through eleventh aspects, the first transmission comprises a control channel and a data channel.

In a thirteenth aspect, alone or in combination with one or more of the first through twelfth aspects, the first transmission comprises a control channel.

In a fourteenth aspect, alone or in combination with one or more of the first through thirteenth aspects, the second transmission is transmitted using non-contiguous resources.

In a fifteenth aspect, alone or in combination with one or more of the first through fourteenth aspects, the second transmission is transmitted using particular resources. In some aspects, the particular resources are selected not to overlap preemptive resources based at least in part on priority levels of one or more other UEs performing a transmission in the window.

In a sixteenth aspect, alone or in combination with one or more of the first through fifteenth aspects, the particular resources are selected based at least in part on a past window or a past transmission by the one or more other UEs.

In a seventeenth aspect, alone or in combination with one or more of the first through sixteenth aspects, the particular resources are not occupied by the transmission associated with the one or more other UEs.

In an eighteenth aspect, alone or in combination with one or more of the first through seventeenth aspects, the particular resources are selected based at least in part on proximity of the one or more other UEs.

In a nineteenth aspect, alone or in combination with one or more of the first through eighteenth aspects, the second transmission comprises one of: a retransmission of the first transmission, or a new transmission different from the first transmission.

In a twentieth aspect, alone or in combination with one or more of the first through nineteenth aspects, the window is selected based at least in part on windows of one or more other UEs. In some aspects, the one or more other UEs satisfy a proximity threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

transmitting, by the UE, a first transmission, wherein the first transmission includes information identifying a window selected based at least in part on another window of another UE of one or more other UEs performing a second transmission in the another window, satisfying a proximity threshold, and wherein the UE is to transmit at least part of a third transmission in the window; and transmitting, by the UE, at least part of the third transmission in the window, wherein the third transmission is transmitted using particular resources that are selected not to overlap preemptive resources based at least in part on one or more priority levels of the one or more other UEs.

2. The method of claim 1, wherein the information identifying the window identifies a length of a frame that is to include the window, or wherein the information identifying the window identifies a frequency associated with the window and a time associated with the window.

3. The method of claim 1, wherein the third transmission is based at least in part on a contention procedure performed by the UE in the window, or wherein the third transmission occupies less than all of the window.

4. The method of claim 3, wherein the UE is associated with a higher listen-before-talk (LBT) priority or a higher contention priority in the window than another UE of the one or more other UEs.

5. The method of claim 1, wherein a size or a location of the window is based at least in part on one or more of a traffic pattern associated with the UE or a latency parameter associated with the UE.

6. The method of claim 1, wherein the information identifying the window explicitly indicates the particular resources for the third transmission.

7. The method of claim 1, wherein a size of the window is based at least in part on a packet size of the third transmission.

8. The method of claim 1, wherein the window is semi-persistently scheduled based at least in part on the information identifying the window.

9. The method of claim 8, wherein the information identifying the window includes one or more bits identifying a repetition scheme or periodicity for the window.

10. The method of claim 1, wherein the first transmission comprises a control channel and a data channel transmission.

11. The method of claim 1, wherein the first transmission comprises a control channel only transmission.

12. The method of claim 1, wherein the third transmission is transmitted using at least two non-contiguous resources of the particular resources.

13. The method of claim 1, wherein the particular resources are selected based at least in part on a past window.

14. The method of claim 1, wherein the particular resources are not occupied by the transmission associated with the one or more other UEs.

15. The method of claim 1, wherein the particular resources are selected based at least in part on proximity of the one or more other UEs.

16. The method of claim 1, wherein the third transmission comprises one of:

a retransmission of the first transmission, or a new transmission different from the first transmission.

17. The method of claim 1, wherein the information identifying the window indicates whether the third transmission is for traffic that is periodic, periodic with jitter, or aperiodic.

18. The method of claim 1, wherein the particular resources are selected based at least in part on a past transmission by the one or more other UEs.

19. A user equipment (UE) for wireless communication, comprising:

a memory; and one or more processors coupled to the memory, the one or more processors configured to:

transmit a first transmission, wherein the first transmission includes information identifying a window selected based at least in part on another window of another UE of one or more other UEs, performing a second transmission in the another window, satisfying a proximity threshold, and wherein the UE is to transmit at least part of a third transmission in the window; and transmit at least part of the third transmission in the window, wherein the third transmission is transmitted using particular resources that are selected not to overlap preemptive resources based at least in part on one or more priority levels of the one or more other UEs.

20. The UE of claim 19, wherein a size or a location of the window is based at least in part on one or more of a traffic pattern associated with the UE or a latency parameter associated with the UE.

21. The UE of claim 19, wherein the information identifying the window explicitly indicates the particular resources for the third transmission.

22. The UE of claim 19, wherein a size of the window is based at least in part on a packet size of the third transmission.

23. The UE of claim 19, wherein the window is semi-persistently scheduled based at least in part on the information identifying the window.

24. The UE of claim 19, wherein the first transmission comprises a control channel and a data channel transmission.

25. The UE of claim 19, wherein the first transmission comprises a control channel only transmission.

26. The UE of claim 19, wherein the other UE has a plurality of priority levels, and wherein the third transmission is transmitted using particular resources that are selected not to overlap preemptive resources based at least in part on the priority levels of the other UE.

27. A non-transitory computer-readable medium storing one or more instructions for wireless communication, the one or more instructions comprising:

one or more instructions that, when executed by one or more processors of a user equipment (UE), cause the one or more processors to:

transmit a first transmission, wherein the first transmission includes information identifying a window selected based at least in part on another window of another UE of one or more other UEs, performing a second transmission in the another window, satisfying a proximity threshold, and wherein the UE is to transmit at least part of a third transmission in the window; and transmit at least part of the third transmission in the window, wherein the second third transmission is transmitted using particular resources that are selected not to overlap preemptive resources based at least in part on one or more priority levels of the one or more other UEs.

28. The non-transitory computer-readable medium of claim 27, wherein the information identifying the window explicitly indicates the particular resources for the second transmission.

29. An apparatus for wireless communication, comprising:

means for transmitting a first transmission, wherein the first transmission includes information identifying a window selected based at least in part on another window of another UE of one or more other UEs, performing a second transmission in the another window, satisfying a proximity threshold, and wherein the apparatus is to transmit at least part of a third transmission in the window; and means for transmitting at least part of the third transmission in the window, wherein the second third transmission is transmitted using particular resources that are selected not to overlap preemptive resources based at least in part on one or more priority levels of the one or more other apparatuses.

30. The apparatus of claim 29, wherein the information identifying the window explicitly indicates the particular resources for the second transmission.

* * * * *